(12) United States Patent
Boev et al.

(10) Patent No.: US 11,662,547 B2
(45) Date of Patent: May 30, 2023

(54) MULTIFOCAL DISPLAY DEVICE AND METHOD

(71) Applicant: Huawei Technologies Co., Ltd., Shenzhen (CN)

(72) Inventors: Atanas Boev, Munich (DE); Panji Setiawan, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 594 days.

(21) Appl. No.: 16/741,849

(22) Filed: Jan. 14, 2020

(65) Prior Publication Data

US 2020/0150379 A1   May 14, 2020

Related U.S. Application Data

(63) Continuation of application No. PCT/EP2017/067893, filed on Jul. 14, 2017.

(51) Int. Cl.
*G02B 7/09* (2021.01)
*G02B 30/52* (2020.01)

(52) U.S. Cl.
CPC .............. *G02B 7/09* (2013.01); *G02B 30/52* (2020.01)

(58) Field of Classification Search
None
See application file for complete search history.

(56) References Cited

U.S. PATENT DOCUMENTS

2016/0147078 A1   5/2016   Bedard et al.

FOREIGN PATENT DOCUMENTS

WO   2019020190 A1   1/2019

OTHER PUBLICATIONS

"DLP Technology for Near Eye Display—Application Report," pp. 1-18, Texas Instruments Incorporated, Dallas Texas, Sep. 2014—Revised Aug. 2017).
Kramida, "Resolving the Vergence-Accommodation Conflict in Head-Mounted Displays," IEEE Transactions on Visualization and Computer Graphics, vol. 22, No. 7, pp. 1912-1931, Institute of Electrical and Electronics Engineers, New York, New York (Jul. 2016).
Lambooij et al., "Visual Discomfort and Visual Fatigue of Stereoscopic Displays: A Review," Journal of Imaging Science and Technology, vol. 53, No. 3, p. 030201-1-030201-14, Society for Imaging Science and Technology, Springfield, Virginia (May-Jun. 2009).

(Continued)

*Primary Examiner* — Darryl J Collins
*Assistant Examiner* — Tamara Y. Washington
(74) *Attorney, Agent, or Firm* — Leydig, Voit & Mayer, Ltd.

(57) ABSTRACT

A multifocal display device has a focus tunable lens, a controller, and a storage. The controller selectively tunes the focus of the lens to a plurality of focal planes of different index during a frame per A focal plane of lower index has a shorter focal distance. The storage stores a plurality of focal plane groups, each group including the plurality of focal planes in a different sequence. The controller selects a first group and tunes, during a first frame period, the focus of the lens to each one of the focal planes in the first group according to their sequence, and selects a second group from groups allowed by a selection rule, and tunes, during a second frame period, the focus of the lens to each one of the focal planes in the second group according to their sequence.

16 Claims, 10 Drawing Sheets

(56) References Cited

OTHER PUBLICATIONS

Hu et al., "Design and Assessment of a Depth-Fused Multi-Focal-Plane Display Prototype," Journal of Display Technology, vol. 10, No. 4, pp. 308-316, Institute of Electrical and Electronics Engineers, New York, New York (Apr. 2014).
Wu et al., "Content-Adaptive Focus Configuration for Near-Eye Multi-Focal Displays," 2016 IEEE International Conference on Multimedia and Expo (ICME), pp. 1-6, Institute of Electrical and Electronics Engineers, New York, New York (Jul. 2016).
Narain et al., "Optimal Presentation of Imagery with Focus Cues on Multi-Plane Displays," ACM Transactions on Graphics, vol. 34, No. 4, Article 59, pp. 1-12 (Aug. 2015).
"Datasheet: EL-10-30-Series, Fast Electrically Tunable Lens," pp. 1-16, Optotune Switzerland AG, Dietikon, Switzerland (May 31, 2017).
Shibata et al., "The Zone of Comfort: Predicting Visual Discomfort with Stereo Displays," Journal of Vision, vol. 11, pp. 1-29, The Association for Research in Vision and Ophthalmology (ARVO), Rockville, Maryland (Jul. 21, 2011).
"TI training and videos; Applications and designs," http://www.ti.com/general/docs/video/watch.tsp?entryid=5157963226001, pp. 1-2, Retrieved from the Internet (Mar. 18, 2020).
Sommerich, "How DLP Works," Tutorial, pp. 64-65, AV Asia Pacific Magazine (2009).
"Principles of Time Domain Imaging," Document No. AN0001, Revision: AB, pp. 1-19, Forth Dimension Displays Limited, United Kingdom (Dec. 19, 2013).

$N_{fp} = 3$

| Focal plane arrangement | Group j | Group j' |
|---|---|---|
| F1, F2, F3 | A | A, B, C |
| F1, F3, F2 | B | A, B, E |
| F2, F1, F3 | C | A, C, D |
| F2, F3, F1 | D | C, D, F |
| F3, F1, F2 | E | B, E, F |
| F3, F2, F1 | F | D, E, F |

| Focal plane arrangement | Group j | Group j' |
|---|---|---|
| F1, F2, F3, F4 | A | E, G |
| F1, F2, F4, F3 | B | A, B, C, D, E, I, K |
| F1, F3, F2, F4 | C | E, G |
| F1, F3, F4, F2 | D | A, B, C, D, G, I, K |
| F2, F1, F3, F4 | E | E, F, G, H |
| F2, F4, F3, F1 | F | E, F, G, H |
| F3, F1, F2, F4 | G | E, F, G, H |
| F3, F4, F2, F1 | H | E, F, G, H |
| F4, F2, F1, F3 | I | B, D, F, I, J, K, L |
| F4, F2, F3, F1 | J | F, H |
| F4, F3, F1, F2 | K | B, D, H, I, J, K, L |
| F4, F3, F2, F1 | L | F, H |

| Focal plane arrangement | Group j | Group j' |
|---|---|---|
| F1, F2, F3, F4, F5 | A | J, L |
| F1, F2, F3, F5, F4 | B | G, H, J, O |
| F1, F2, F4, F3, F5 | C | J, L |
| F1, F2, F4, F5, F3 | D | A, B, C, D, E, G, H, L, O |
| F1, F3, F2, F4, F5 | E | J, L |
| F1, F3, F5, F4, F2 | F | A, B, C, E, F, J, L |
| F2, F1, F3, F4, F5 | G | J, L |
| F2, F1, F3, F5, F4 | H | G, H, J, Q |
| F2, F1, F4, F5, F3 | I | G, I, J |
| F2, F4, F1, F3, F5 | J | J, M |
| F3, F1, F2, F4, F5 | K | H, K |
| F3, F5, F4, F2, F1 | L | K, L, N |
| F4, F2, F1, F3, F5 | M | D, K, M, N |
| F4, F5, F3, F1, F2 | N | I, K |
| F4, F5, F3, F2, F1 | O | I, K, O, P, R, S, T |
| F5, F3, F1, F2, F4 | P | I, K |
| F5, F3, F4, F2, F1 | Q | F, I, M, N, P, Q, R, S, T |
| F5, F4, F2, F1, F3 | R | I, K |
| F5, F4, F2, F3, F1 | S | F, K, M, N |
| F5, F4, F3, F1, F2 | T | I, K |

Fig. 7

MULTIFOCAL DISPLAY DEVICE AND METHOD

CROSS-REFERENCE TO RELATED APPLICATIONS

This application is a continuation of International Application No. PCT/EP2017/067893, filed on Jul. 14, 2017, the disclosure of which is hereby incorporated by reference in its entirety.

TECHNICAL FIELD

The present disclosure relates to a Multifocal Display (MFD) device and a corresponding method for providing a multifocal display. The MFD device of the present disclosure can be used, for example, for a Near Eye Display (NED) device, or a Near-To-Eye (NTE) application or device, or a Head Mounted Display (HMD) device. The present disclosure relates to controlling a focus of a focus tunable lens of such an MFD device.

BACKGROUND

MFD devices have recently received increasing attention in industry, due to their ability to create a small and portable personal viewing experience. MFD devices may be applied in the category of Augmented Reality (AR), which typically uses a See-Through NED device, and in the category of Virtual Reality (VR), which typically uses an Immersive NED device.

A MFD device (here particularly a NED device) is shown in FIG. 8. In order to create the impression of a multifocal 3D display, a viewing distance of a single 2D display from the eye of a user is rapidly switched in synchronization with the rendering of frames of multiple focal planes, in order to create an ideally flicker-free perception.

One key requirement for such a MFD device, particularly to switch the viewing distance of the 2D display, is a high-speed focal modulator element, which may use a focus tunable lens, in order to continually adjust/modulate the focal length or optical power of the lens. For instance, an electrically focus-tunable lens or a deformable membrane mirror device (DMMD) may be used as the focus tunable lens.

The MFD device of FIG. 8 further includes an ultrafast display element, which includes, for instance, a Digital Micromirror Device (DMD) or a Liquid Crystal on Silicon (LCOS), e.g., a Ferroelectric LCOS (FCLOS). Such a display element is used to sequentially display color images at a flicker fusion threshold speed of at least 60 Hz frame rate. Both the display element and the focus tunable lens of the focal modulator element are controlled by a controller of the MFD device.

FIG. 9 shows that by controlling the focus tunable lens, discrete focal planes may be placed to divide an extended 3D scene volume into multiple zones along the visual axis. Virtual objects within a zone are rendered by the corresponding pair of adjacent focal planes, such that the 2D perspective images of these objects are displayed at a nearly correct focal distance. A focal distance is the distance between the center of the lens and the focal plane. In particular the focus tunable lens is able to change its focal distance, in order to selectively focus on one of a plurality of focal planes of different index. In FIG. 9 a focal plane of lower index has a shorter focal distance, and in total four focal planes of indices 1 to 4 are shown.

FIG. 10 shows how different focus planes (here also four focal planes of different 1 to 4 are illustrated) are controller over time (x-axis). The optical power D of the focus tunable lens is plotted in FIG. 10 (on the y-axis), and may be adjusted by applying a control signal of changing value. For example, a signal of changing current intensity may be applied to change focal planes (optical power), one current intensity for each optical power of the lens. Accordingly, for generating optical power steps (jumps between two focal planes), in order to rapidly change between different focal planes, a control signal in the form of a current step is preferably applied.

Typically all of the used focal planes are selected once during a frame period of $1/60$ s. During each focal plane, color information (here indicated by 'RGB') is transmitted, i.e. for the example of four focal planes this happens at a frame period of $1/60$ s within 4.2 ms.

Unfortunately, as can be seen from a datasheet by Optotune ("Datasheet: EL-10-30-Series Fast Electrically Tunable Lens, Update: 31 May 2017"), due to lens inertia a significant oscillation artifact (overshoot+ringing) can appear in the optical response of a focus tunable lens. The oscillation artifact is characterized by a rise time and a settling time. In particular, FIG. 12 of the EL-10-30 datasheet shows the optical response (change of optical power) of a focus tunable lens when the current intensity is increased from a value of 0 mA to values of either 100 mA, 150 mA or 200 mA, respectively. A pronounced overshoot and ringing, which is stronger when a higher current step is applied, can be observed. The same is observable for the opposite 'direction' of the current step, i.e. for a decrease of the current value. That is, the focus tunable lens shows an optical response that is distorted, the distortion depending on the height of the current step of the control signal that is applied to the lens.

FIG. 13 of the Optotune EL-10-30 datasheet also shows that the frequency response of an oscillating current (from 50-150 mA) shows resonant frequencies, which are actually the cause for the pronounced artifacts shown in FIG. 12 of the datasheet. These artifacts can have a strong negative impact of the image quality of the MFD device, particularly with respect to flicker of the produced multifocal display.

So far, the above-described problem has mainly been addressed by applying preprocessing methods so as to enhance the optical and frequency response of the focus tunable lens. However, these proposed solutions are insufficient to guarantee a high image quality, especially flicker-free MFD device.

SUMMARY

In view of the above-mentioned problems and disadvantages, the embodiments of the present invention improve conventional MFD devices and methods. The exemplary embodiments of the present invention provide an MFD device and method for providing a multifocal display with improved image quality, particularly with less flickering. The impact of artifacts occurring at transition between focal planes of the focus tunable lens should be reduced, if not even eliminated.

The present disclosure provides a modified focal plane arrangement to be used by the MFD device to control the focus tunable lens.

A first aspect of the present disclosure provides an MFD device, including a focus tunable lens, a controller configured to selectively tune the focus of the lens to a plurality of N focal planes during a frame period, the focal planes having indices 1 to N assigned to them in increasing or decreasing order of their focal distances, a storage storing a plurality of focal plane groups, each group including the plurality of focal planes in a different sequence, wherein the controller is configured to select a first group, and tune, during a first frame period, the focus of the lens to each one of the focal planes in the first group according to their sequence, wherein the controller is configured to select a second group from groups allowed by a selection rule and tune, during a second frame period, the focus of the lens to each one of the focal planes in the second group according to their sequence, and wherein the selection rule includes that an index difference between the last focal plane in the sequence of the first group and the first focal plane in the sequence of a second group is 0 or 1 or 2.

Since the optical response of the focus tunable lens varies depending on the focal plane difference, i.e. on the control signal change, e.g. on the difference in current intensities of the respectively applied control signals (a larger difference means a longer rise and settling time and thus more pronounced ringing), the modified focal plane arrangement, i.e. the sequential arrangement of the focal planes according to the different focal plane groups and the selection rule, respectively, leads to less extreme control signal changes; and thus, to considerably less flicker and a better image.

The controller choosing actively a group for each frame period while respecting the selection rule increases the probability that the focal planes are ordered in different sequences. This ensures that different transitions between focal planes are performed. Furthermore, by respecting the selection rule, it is ensured that a focal plane jump occurs only for focal planes distanced by an index of 2. That is, large focal plane jumps are avoided, and thus also larger control signal changes that produce a more pronounced artifacts, which impact negatively on the image quality.

In an implementation form of the first aspect, the selection rule includes that an index difference between the last focal plane in the sequence of the first group and the first focal plane in the sequence of a second group is 1 or 2.

In a further implementation form of the first aspect, the selection rule further includes that a position distance between two focal planes of same index in the concatenated sequences of the first group and the second group, respectively, is between a minimum allowed distance and a maximum allowed distance.

The lower the maximum allowed distance is, the less the flickering will be, and thus the better the image quality will be.

In a further implementation form of the first aspect, the minimum allowed distance is 2.

That is, the same focal plane is not set twice in a row.

In a further implementation form of the first aspect, the maximum allowed distance $$(2N_{fp} - 2) \text{ to } \left(2N_{fp} - \left\lceil \frac{N_{fp}}{2} \right\rceil\right),$$

is in a range of with $N_{fp}$ being the total number of the plurality of focal planes, and $\lceil\ \rceil$ denoting the ceiling function.

The above range provides the overall best performance, especially for a large range of the total number of focal planes.

In a further implementation form of the first aspect, the controller is configured to select a second group randomly from the groups allowed by the selection rule.

While such real randomness is computationally intense, it provides the overall best results in terms of image quality, because the impact of the artifacts on the different focal planes is over time evenly distributed.

In a further implementation form of the first aspect, the controller is configured to select the second group according to a predefined pattern from the groups allowed by the selection rule.

By using a predefined pattern, a quasi-randomness can be achieved, which produces very good results (as it approaches real randomness), but it is computationally less intense than real randomness.

In a further implementation form of the first aspect, the controller is configured to select the second group from the groups allowed by the selection rule depending on the number of times the first group was so far selected.

Thereby, a predefined pattern, which equalizes over time and achieves quasi-randomness is implemented.

In a further implementation form of the first aspect, the first group is included in the groups allowed by the selection rule, or the first group is not included in the groups allowed by the selection rule.

In a further implementation form of the first aspect, the plurality of focal plane groups includes one group for each possible sequence of the plurality of focal planes, for which each individual focal plane appears only once in a group and an index difference between two adjacent focal planes in the sequence of the groups is two or less.

With the use of such designed focal plane groups, the best results in terms of image quality are achieved, while keeping the computational effort low.

In a further implementation form of the first aspect, the controller is configured to select the first group randomly from the plurality of groups, if no other group was selected before it.

That means, after system initialization (start-up), the controller randomly picks the very first group to begin with randomly.

A second aspect of the present disclosure provides a method for providing a Multifocal display, including steps of selectively tuning the focus of a focus tunable lens to a plurality of N focal planes during a frame period, the focal planes having indices 1 to N assigned to them in increasing or decreasing order of their focal distances, storing a plurality of focal plane groups, each group including the plurality of focal planes in a different sequence, wherein the tuning step includes selecting a first group, and tuning during a first frame period, the focus of the lens to each one of the focal planes in the first group according to their sequence, and selecting a second group from groups allowed by a selection rule, and tuning, during a second frame period, the focus of the lens to each one of the focal planes in the second group according to their sequence, wherein the selection rule includes that an index difference between the last focal plane in the sequence of the first group and the first focal plane in the sequence of the group is two or less.

In an implementation form of the second aspect, the selection rule includes that an index difference between the last focal plane in the sequence of the first group and the first focal plane in the sequence of a second group is 1 or 2.

In a further implementation form of the second aspect, the selection rule further includes that a position distance between two focal planes of same index in the concatenated sequences of the first group and the second group, respectively, is between a minimum allowed distance and a maximum allowed distance.

In a further implementation form of the second aspect, the minimum allowed distance is 2.

In a further implementation form of the second aspect, the maximum allowed distance is in a range of $$(2N_{fp} - 2) \text{ to } \left(2N_{fp} - \left\lceil \frac{N_{fp}}{2} \right\rceil\right),$$

with $N_{fp}$ being the total number of the plurality of focal planes, and $\lceil \ \rceil$ denoting the ceiling function.

In a further implementation form of the second aspect, a second group is selected randomly from the groups allowed by the selection rule.

In a further implementation form of the second aspect, the second group is selected according to a predefined pattern from the groups allowed by the selection rule.

In a further implementation form of the second aspect, the second group is selected from the groups allowed by the selection rule depending on the number of times the first group was so far selected.

In a further implementation form of the second aspect, the first group is included in the groups allowed by the selection rule, or the first group is not included in the groups allowed by the selection rule.

In a further implementation form of the second aspect, the plurality of focal plane groups includes one group for each possible sequence of the plurality of focal planes, for which each individual focal plane appears only once in a group and an index difference between two adjacent focal planes in the sequence of the groups is two or less.

In a further implementation form of the second aspect, the first group is selected randomly from the plurality of groups, if no other group was selected before it.

With the method of the second aspect and its implementation forms, the advantages and effects of the MFD device and its respective implementation forms can be achieved.

A third aspect of the present disclosure provides a computer program product including a program code for controlling a MFD device according to the first aspect or any of its implementation forms.

Accordingly, with the third aspect all advantages and effects of the first aspects can be achieved.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of exemplary embodiments, a specific functionality or step to be performed by external entities is not reflected in the description of a particular detailed element of that entity, which performs that step or functionality, it should be clear for a skilled person that these methods and functionalities can be implemented in respective software or hardware elements, or any kind of combination thereof.

BRIEF DESCRIPTION OF DRAWINGS

The above-described aspects and implementation forms will be explained in the following description of exemplary embodiments in relation to the enclosed drawings, in which

FIG. 5 shows focal plane arrangement and selection rules for a total number of three focal planes;

FIG. 6 shows a focal plane arrangement and selection rules for a total number of four focal planes;

FIG. 7 shows a focal plane arrangement and selection rule for a total number of five focal planes;

DETAILED DESCRIPTION OF EMBODIMENTS

Figure 1:
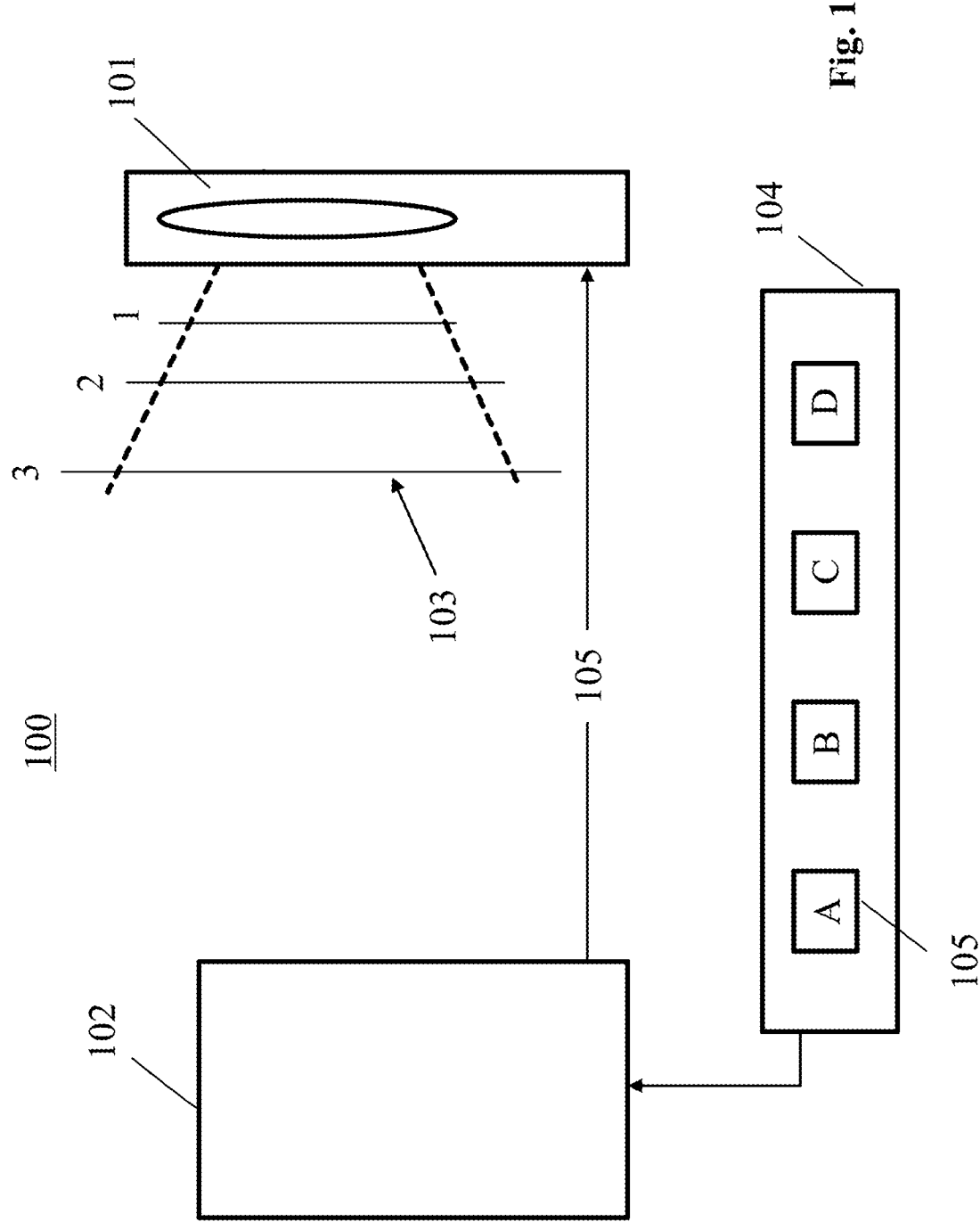
FIG. 1 shows an MFD device according to an embodiment of the present disclosure.

FIG. 1 shows an MFD device 100 according to an embodiment of the present disclosure. The MFD device 100 may be an NED device, NTE device, or HMD device, or may be included in one such device.

The MFD device 100 includes at least one focus tunable lens 101, which may be an electrically focus-tunable lens, a shape-changing lens, and/or a DMMD. The focus tunable lens 101 is able to focus to a plurality of focal planes 103 of different index, where a focal plane 103 of lower index has a shorter focal distances, i.e. is closer to the lens 101. In other words, the N focal planes have integer indices 1 to N assigned to them in increasing order of their focal distances. Equivalently, a focal plane 103 of lower index may have a larger focal distance, in which case the N focal planes have integer indices 1 to N assigned to them in decreasing order of their focal distances. That is, important is a clear ordered relation between index and distance, either ascending or descending.

The indices 1 to N are used in the present disclosure merely to identify each focal plane in a simple manner for the purpose of description. That is, the indices 1 to N are names or identifiers of the individual focal planes, which are assigned to the focal planes in accordance with the respective focal distances (either ascending or descending). This assignment of indices is done by the present disclosure itself and should not be construed as some dedicated information processing operation performed by the MFD device 100 (or any other physical unit). In other words, none of the indices needs to be implemented in the MFD device 100 by a certain piece of information (such as a signal or a bit sequence).

The MFD device 100 further includes a controller 102, which may be a computer processor or microcontroller or the like. The controller 102 is configured to selectively tune the focus of the lens 101 to the plurality of focal planes 103 during a frame period, specifically during each of multiple frame periods. Here, exemplarily three focal planes 103 with indices 1, 2 and 3 are shown. However, there can also be more focal planes, e.g. 4-20 focal planes. Thus, for instance, if a sequence of images provided by a display element of the MFD device 100 is viewed by the user, the user may see the images as virtual images at different distances corresponding to the different focal planes 103. Thus, the user is provided with the impression of a 3D image. This is also due to the high frame rate of e.g. 1/60 s, at which the user cannot distinguish anymore the individual images produced by the MFD device 100 for the different focal planes 103.

The MFD device 100 further includes a storage 104, which may be a memory, a hard drive, a solid state storage, or the like, which stores a plurality of focal plane groups 105 (here in FIG. 1 exemplarily focal plane groups 105a, 105b, 105c and 105d are shown), where each group 105 includes the plurality of focal planes 103 of different index in a different sequence.

The controller 102 is now configured to select, for any two consecutive frame periods, specific groups 105 from this plurality of groups. In particular, for a first frame period the controller 102 is configured to select a first group (e.g. 105a), and to tune the focus of the lens 101 to each one of the focal planes 103 in the first group according to their sequence in this group 105a. Then, the controller 102 is configured to select a second group (e.g. 105c) from groups 105 allowed by a selection rule, and tune, during a second frame period (following the first frame period) the focus of the lens 101 to each one of the focal planes 103 in the second group 105c according to their sequence in this group 105c.

The selection rule may include that an index difference between the last focal plane 103 in the sequence of the first group 105a, and the first focal plane 103 in the sequence of the second group 105c is 0 or 1 or 2.

Figure 2:
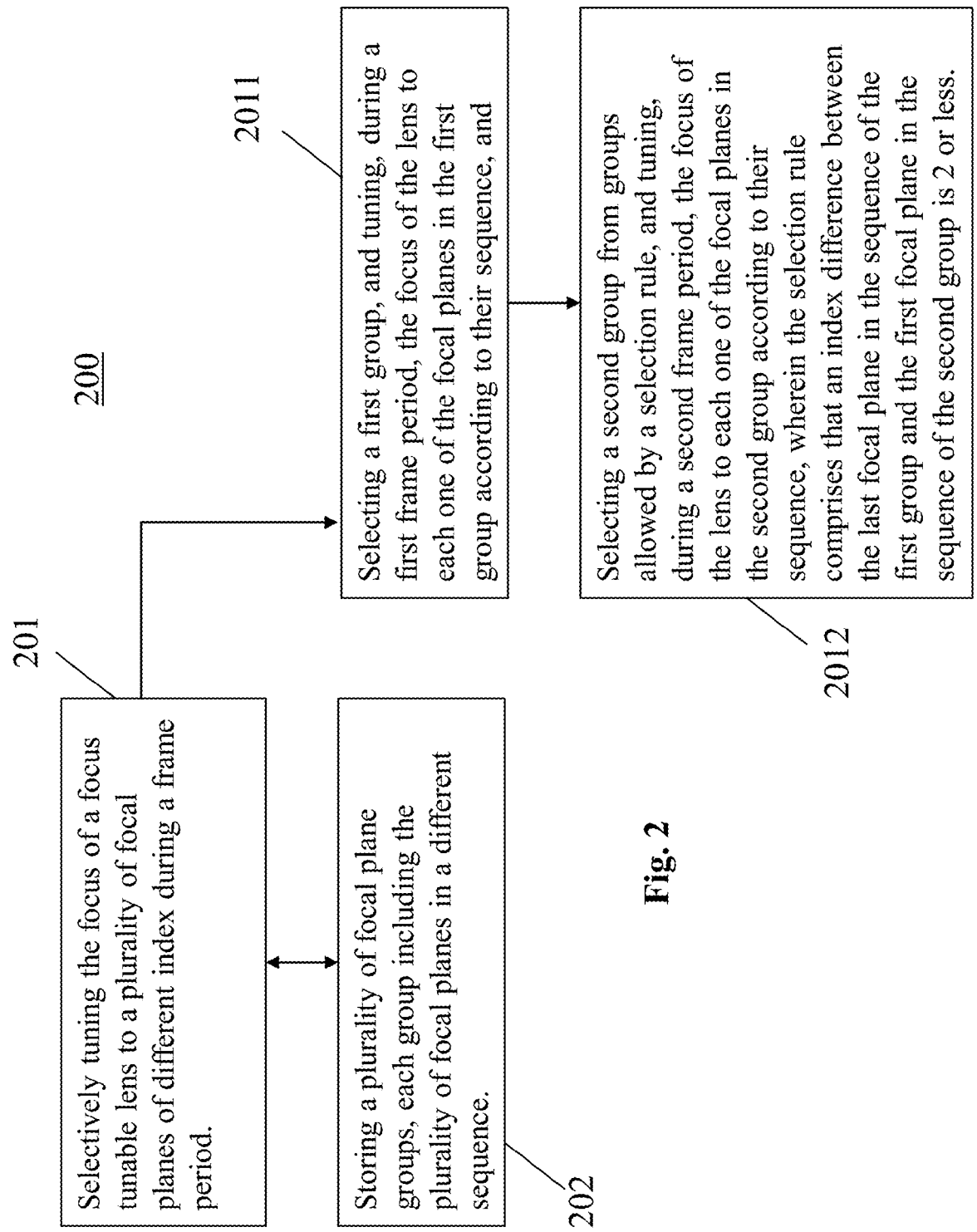
FIG. 2 shows a method according to an embodiment of the present disclosure.

FIG. 2 shows a corresponding method 200 for providing a multifocal display. The method 200 includes a step 201 of selectively tuning the focus of a focus tunable lens 101 to a plurality of focal planes 103 of different index during a frame period. And, it includes a step 202 of storing a plurality of focal plane groups 105, each group 105 including the plurality of focal planes 103 in a different sequence. Specifically the step 201 includes selecting 2011 a first group 105, and tuning, during a first frame period, the focus of the lens 101 to each one of the focal planes 103 in the first group 105 according to their sequence. The step 201 then also includes a second step 2012 of selecting a second group 105 from groups 105 allowed by a selection rule, and tuning during a second frame period, the focus of the lens 101 to each one of the focal planes 103 in the second group 105 according to their sequence, wherein the selection rule includes that an index difference between the last focal plane 103 in the sequence of the first group 105 and the first focal plane 103 in the sequence of the second group 105 is 0 or 1 or 2.

These steps of the method 200 may be carried out by the MFD device 100 of FIG. 1, specifically by the focus tunable lens 101, the controller 102, and the storage 104, respectively.

Figure 3:
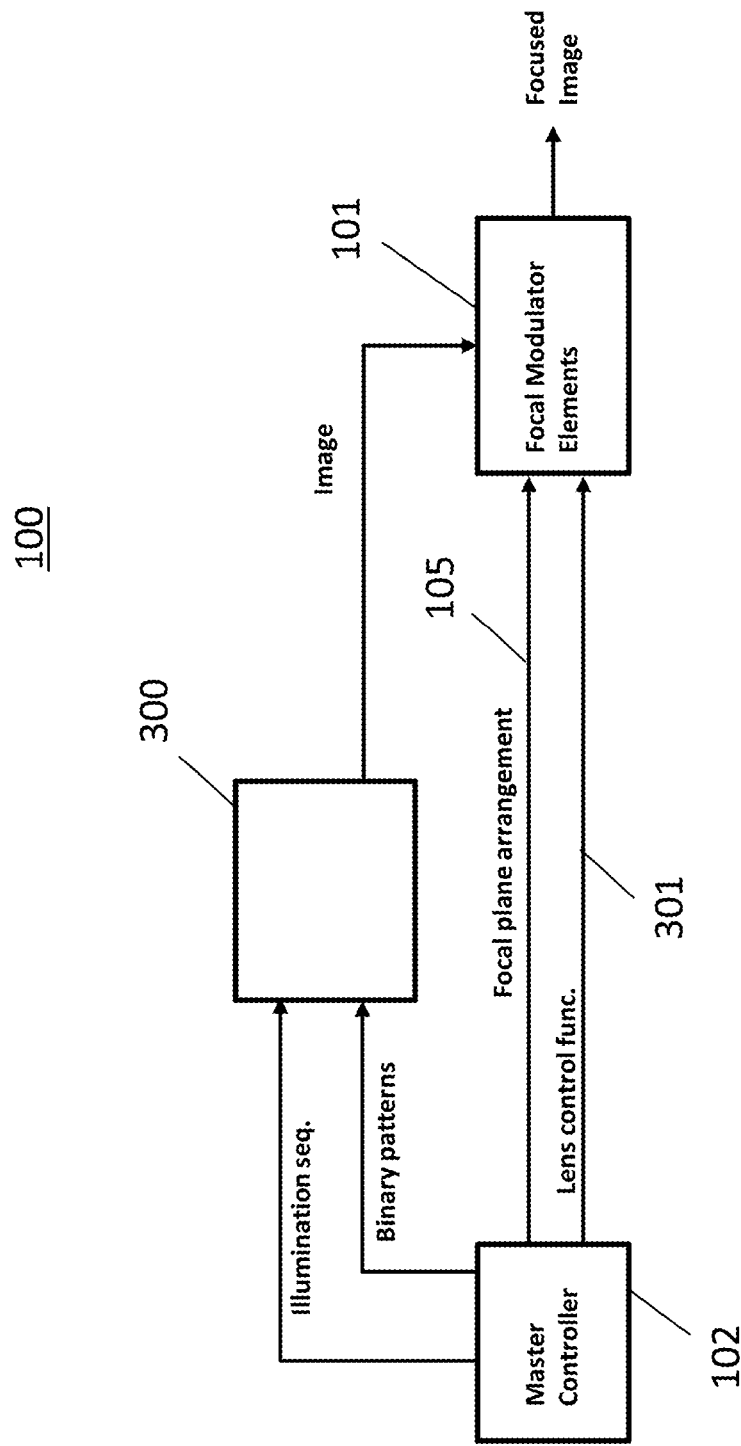
FIG. 3 shows an MFD device according to an embodiment of the present disclosure.

FIG. 3 shows an MFD device 100 according to an embodiment of the present disclosure, which builds on the MFD device shown in FIG. 1. The MFD device 100 of FIG. 3 again includes the controller 102 and the focus tunable lens 101 (here in the focal modulator element). The controller 102 is configured to tune the focus of the lens 101 by applying a control signal 301 of a different value for each focal plane index. For instance, the controller 102 may apply a control signal of varying (preferably step-wise varying) current intensity to the lens 101. In order to tune the lens 101 to different focal planes 103, the controller 102 may provide a sequence current steps or current intensity patterns. The controller 102 is also configured to provide a focal plane arrangement 105 to the focus tunable lens 101, namely in form of the selected groups 105 as described above. That is, by selecting a group 105 for each frame period, and since each group 105 includes a sequence of the focal planes 103, the controller 102 effectively provides an ongoing sequence of (repeating) focal planes, i.e. a focal plane arrangement, to the lens 101.

The controller 102 in the MFD device 100 of FIG. 3 is also configured to control a display element 300 of the MFD device 100, by providing an illumination sequence and a binary pattern. The binary pattern provides the display element 300, which may include a DMD device, with different images, preferably of images for different bit planes of different significance, wherein the different bit planes are combined into a final image. Further, the illumination sequence corresponds to the binary pattern, and provides the display element 300 with an instruction about how strong to illuminate each bit plane image. The illumination sequence may particularly control an LED included in the display element 300 and/or also color element, which may be used to provide the illumination light with a specific color for each bit plane image.

The image produced by the display element 300 is provided to the focus modulator element including the focus tunable lens 101. Specifically, an image is provided for each focal plane that is selectively set during a frame period. The lens 101 focuses for each image to the corresponding focal plane, in order to provide a focused image, and thus, overall the impression of the 3D image can be generated.

Figure 4:
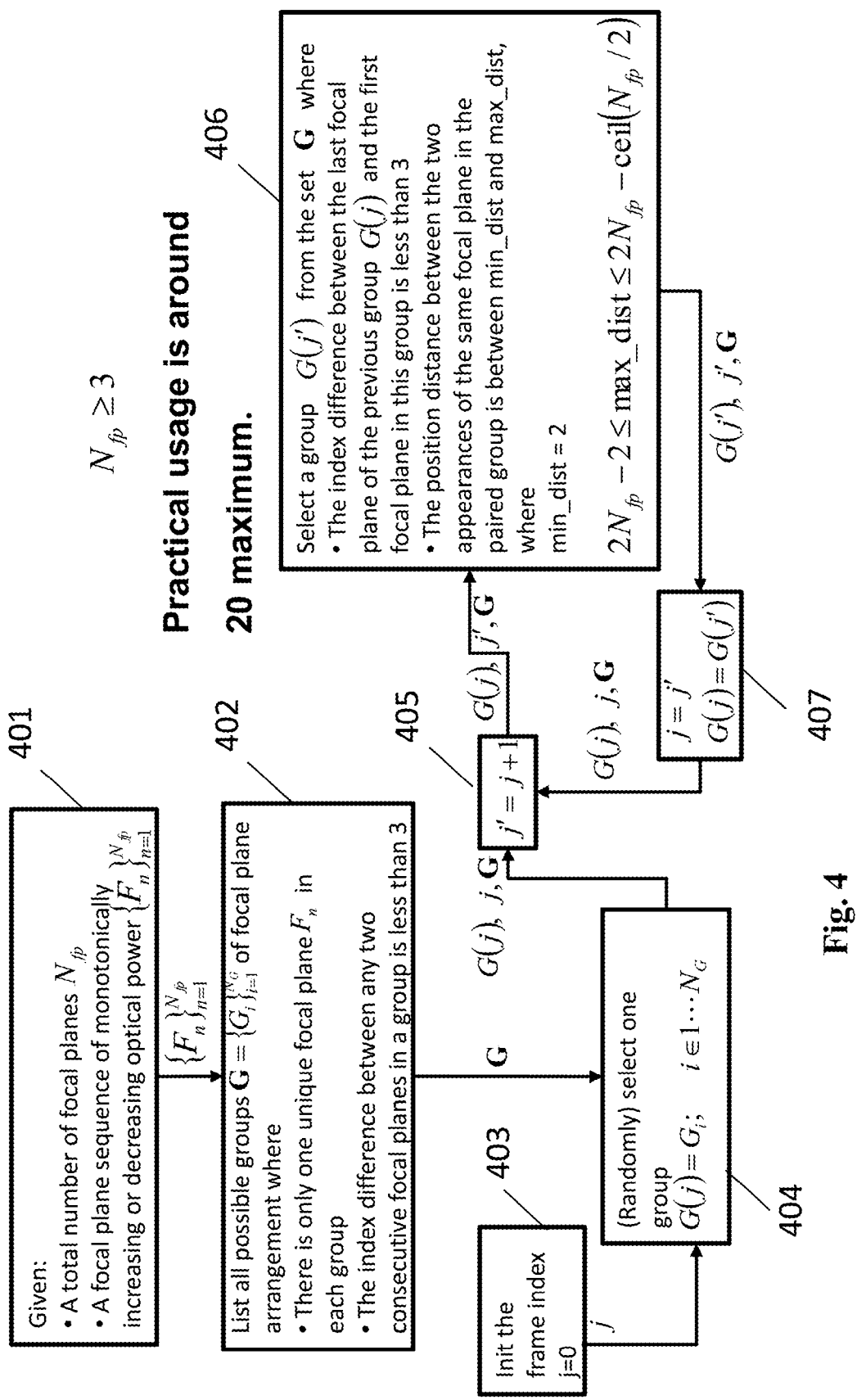
FIG. 4 shows schematically steps of a method according to an embodiment of the present disclosure.
Figure 8:
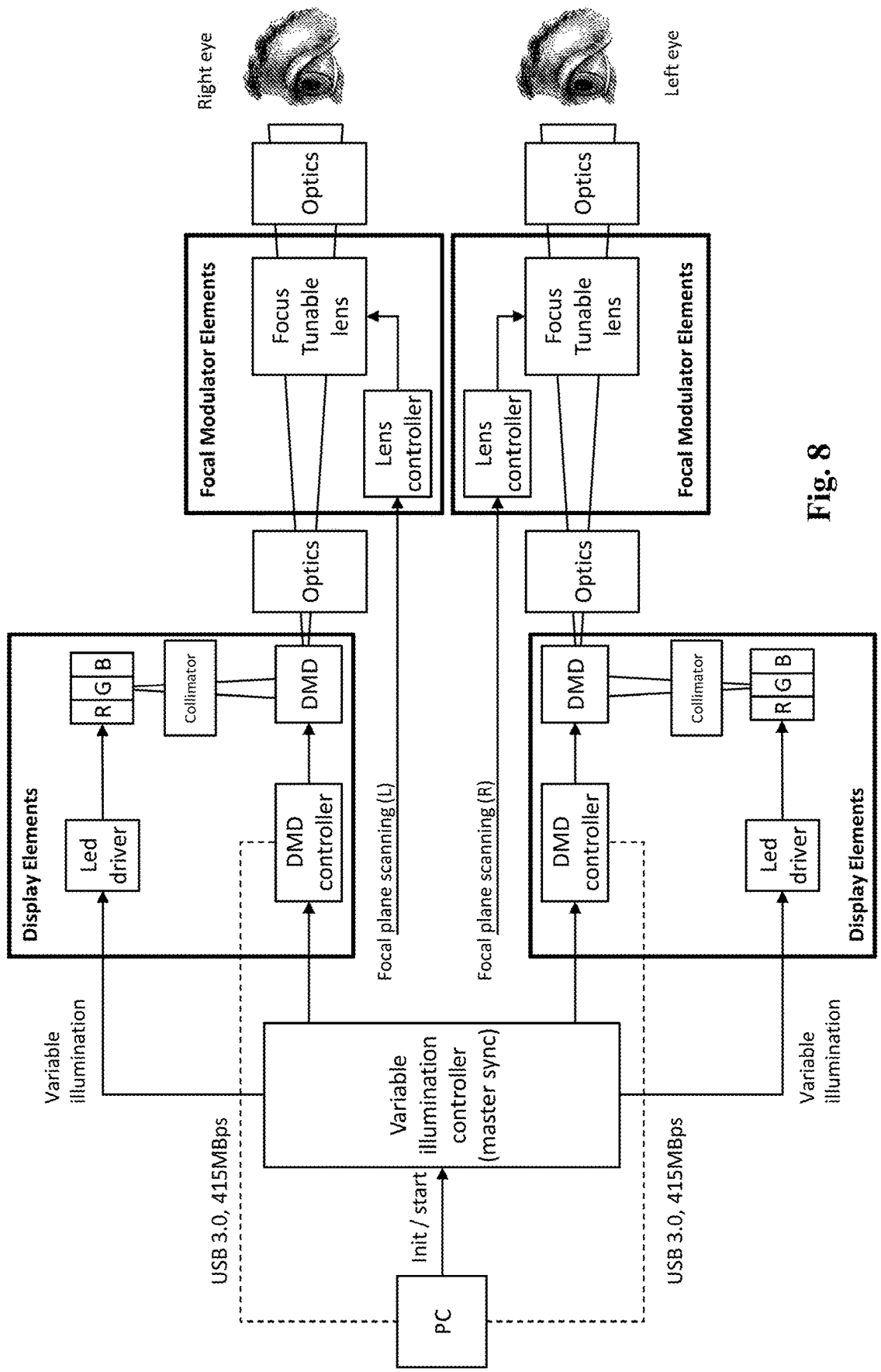
FIG. 8 shows a conventional MFD device.
Figure 9:
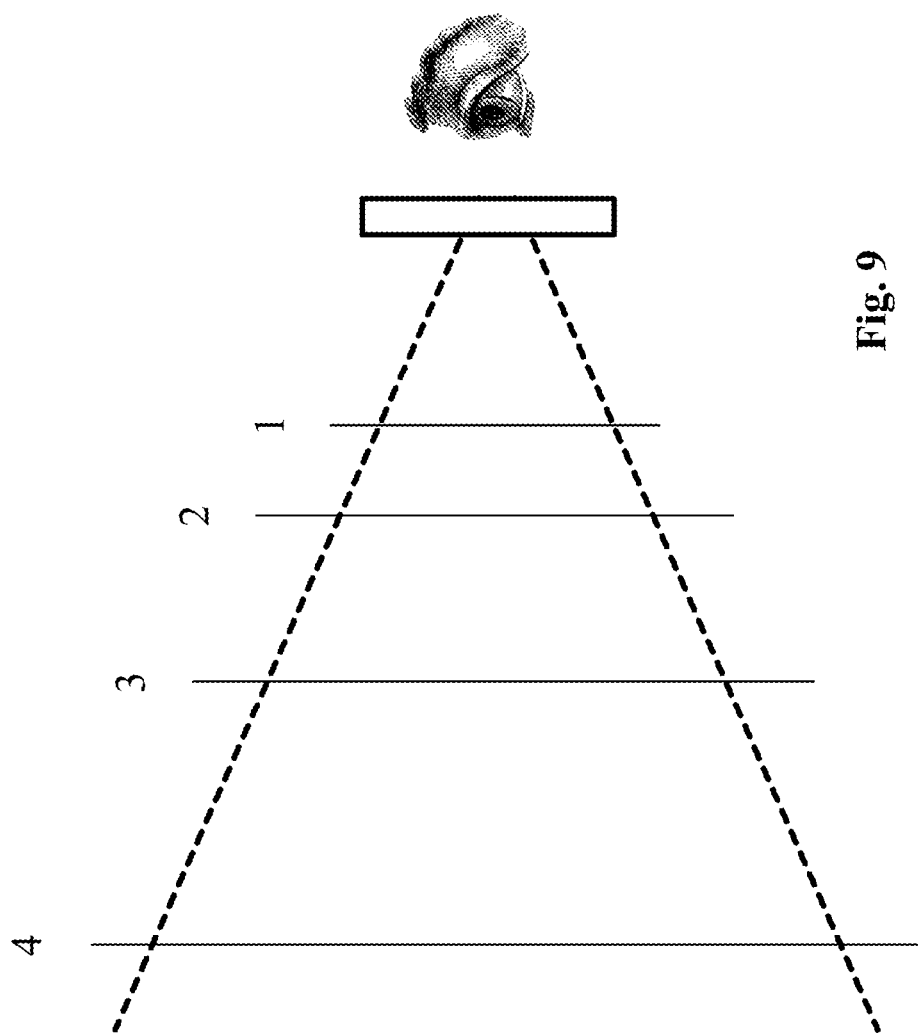
FIG. 9 shows focal planes of different index.
Figure 10:
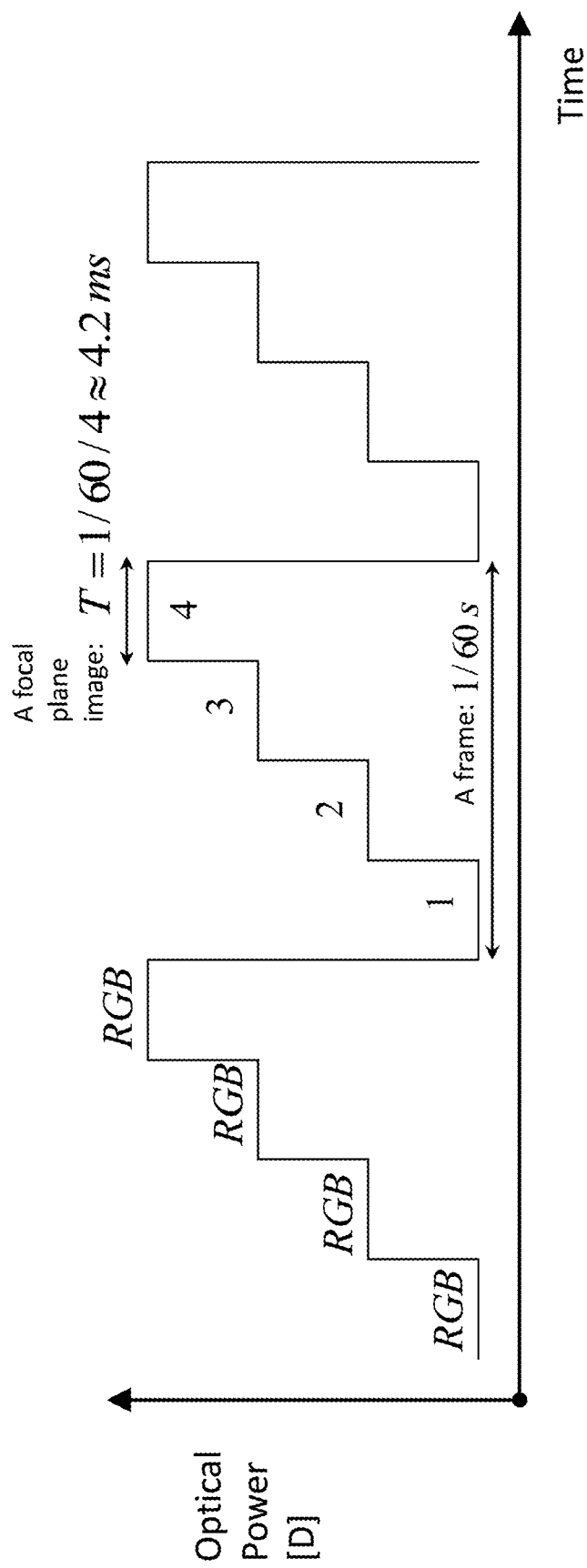
FIG. 10 shows schematically an optical power of a focus tunable lens over time for four focal planes of different index.

FIG. 4 shows schematically, how a method of the present disclosure modifies the focal plane arrangement, i.e. how to select the respective focal plane groups 105.

Starting point is a given total number of focal planes $Nf_p$ and a focal plane sequence of monotonically increasing or decreasing optical power. This is shown in box 401 of FIG. 4. The practical usage is here limited to a maximum of 20 focal planes.

As shown in box 402, all possible groups of focal planes arrangements are listed with the following restrictions. In each focal plane group 105 there is only one unique focal plane, i.e. each focal plane 103 should appear only once in each group 105. Further, the index difference between any two consecutive focal planes 103 in a group 105 should be less than 3. That is, an index difference between two adjacent focal planes 103 in the sequence of a group 105 is 0 or 1 or 2.

As shown in box 403, the frame index is initiated to j=0. For j=0, i.e. if no other group 105 was selected before, the first group 105 may be selected randomly from the plurality of groups 105, which was formed at box 402.

The index, the selected group 105 and the plurality of groups 105 is provided to box 405, in which an index j' is set equal to j+1. Then, as shown in box 406, a group for the next frame period is selected from the groups 105, according to a selection rule, i.e. from groups 105 allowed by the selection rule. The selection rule preferably includes that the index difference between the last focal plane 103 of the previous group 105 (of index j) and the first focal plane 103 in the group 105 of index j' is less than 3. That is, an index difference between the last focal plane 103 in the sequence of the first group 105 and the first focal plane 103 in the sequence of the second group 105 is 0 or 1 or 2.

Preferably, the second criterion for the selection rule is that the position distance between the two appearances of the same focal plane 103 and the paired group 105 is between a minimum and a maximum distance. That is, the selection rule preferably also includes that a position distance between two focal planes 103 of the same index in the concatenated sequences of the first group 105 and second group 105, respectively, is between the minimum allowed distance and the maximum allowed distance. The minimum allowed distance is 2, and the maximum allowed distance is provided by the following formula:

$$2N_{fp}-2 \leq \text{maximum allowed distance} \leq 2N_{fp}-\text{ceil}(N_{fp}/2)$$

with $N_{fp}$ being the total number of the plurality of focal planes, and cell denoting the ceiling function.

Then the allowed groups 105, selected group 105, and index j' are output, and at box 407j' is set equal to j. Then, the re-indexed allowed groups, selected group and index j are provided to box 405, which increases the index again, and the method returns to box 406, where the group 105 for the next frame period is selected.

FIG. 5 shows an example for a focal plane arrangement, groups 105 and selection rule for three focal planes 103. In particular six focal plane arrangements as shown in the first column of the table are possible according to the creation rule defined in box 402 of FIG. 4. The groups 105 may be named A-F. This is shown in the second column of the table. In the third column of the table is shown the group j', i.e. the groups 105 that are allowed by the selection rule as next group 105, for a next frame period, in case of a specific current group j, for a current frame period. That means, the allowed groups depend on the group 105, which was selected in the previous frame period. For instance, if in the first frame period a group A was selected, then according to the selection rule, for the second frame period, only the groups A, B, C are allowed. Likewise, if in a certain frame period, the group B was selected, then for the next frame period only the groups A, B or E are allowed. Within the groups 105 allowed by the selection rule, it is possible to randomly pick one group 105. It is also possible to select the group 105 for the next frame period according to a pre-defined pattern from the groups 105 allowed by the selection rule. For instance, the predefined pattern may base on the number of times the first group 105 was so far selected.

In the example of FIG. 5 this may mean that if group A is selected for the first time, the first-listed group A is selected from the groups A, B and C allowed as next groups. That is, group A is selected again. That is, the first group 105 may even be included in the groups 105 allowed by the selection rule. However, the first group 105 may also be excluded from these allowed groups 105. Then, if group A is selected for the second time, the second-listed group B is chosen as next group 105 from the allowed groups A, B, C. Then, if group A is selected for the third time, the third-listed group C is chosen for the next group 105 from the allowed groups A, B, C. Then the pattern returns to the beginning, i.e. if group A is chosen for the fourth time, the group A is chosen as next group 105 from the allowed groups A, B, C, and so on.

FIG. 6 shows a likewise example for a total number of four focal planes. Now 12 focal plane arrangements, i.e. 12 groups 105, as shown in the first column of the table are formed, and are denoted A-L, as shown in the second column. The third column of the table in FIG. 6 again shows the groups 105 allowed according to the selection rule. Again, a real or quasi-randomness by applying a predefined pattern for selecting the groups 105 allowed by the selection rule can be implemented.

FIG. 7 shows a likewise example for a total number of five focal planes 103. Now, according to these creation rules defined by the present disclosure, 20 focal plane arrangements shown in the first column are possible, and result in the groups A-T shown in the second column of the table. Again, the groups 105 allowed by the selection rule are shown in the third column of the table.

Of course, the scheme of the present disclosure, which is used in MFD device 100 and method 200, applies also to higher focal plane numbers, preferably to a total number of focal planes between 6 and 20.

The present invention has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A multifocal display device, the multifocal display device comprising:
    a focus tunable lens;
    a controller configured to selectively tune a focus of the focus tunable lens to a plurality of N focal planes during a frame period, the focal planes having indices 1 to N assigned thereto in increasing or decreasing order of the focal planes' focal distances,
    a storage storing a plurality of focal plane groups, each group comprising the plurality of focal planes in a different sequence, each of the focal planes appears only once in each of the focal plane groups, an index difference between two adjacent focal planes in the sequence of one of the groups is 0 or 1 or 2,
    wherein the controller is configured to select a first group of the focal plane groups, and tune, during a first frame period, the focus of the focus tunable lens to each one of the focal planes in the first group according to the corresponding sequence,
    wherein the controller is configured to select a second group from the focal plane groups allowed by a selection rule, and to tune, during a second frame period, the focus of the focus tunable lens to each one of the focal planes in the second group according to the corresponding sequence, and
    wherein the selection rule comprises that an index difference between a last focal plane of the focal planes in the sequence of the first group and a first focal plane of the focal planes in the sequence of the second group is 0 or 1 or 2.

2. The multifocal display device according to claim 1, wherein
    the selection rule comprises that the index difference between the last focal plane in the sequence of the first group and the first focal plane in the sequence of the second group is 1 or 2.

3. The multifocal display device according to claim 1, wherein
    the selection rule further comprises that a position distance between two focal planes, of the focal planes, of a same index in the concatenated sequences of the first group and the second group, respectively, is between a predetermined minimum allowed distance and a predetermined maximum allowed distance.

4. The multifocal display device according to claim 3, wherein
    the minimum allowed distance is 2.

5. The multifocal display device according to claim 3, wherein
the maximum allowed distance is in a range of $(2N_{fp}-2$ to $\left(2N_{fp}-\left\lceil\frac{N_{fp}}{2}\right\rceil\right))$, with $N_{fp}$ being a total number of the plurality of focal planes, and $\lceil\ \rceil$ denoting a ceiling function.

6. The multifocal display device according to claim 1, wherein
the controller is configured to select the second focal plane group randomly from the focal plane groups allowed by the selection rule.

7. The multifocal display device according to claim 1, wherein
the controller is configured to select the second focal plane group according to a predefined pattern from the focal plane groups allowed by the selection rule.

8. The multifocal display device according to one of the claim 1, wherein
the controller is configured to select the second focal plane group from the focal plane groups allowed by the selection rule depending on a number of times the first group was so far selected.

9. The multifocal display device according to claim 1, wherein
the first focal plane group is included in the focal plane groups allowed by the selection rule, or
the first focal plane group is not included in the focal plane groups allowed by the selection rule.

10. The multifocal display device according to claim 1, wherein the plurality of focal plane groups comprises one focal plane group for each possible sequence of the plurality of focal planes, for which each individual focal plane of the focal planes appears only once in a focal group of the focal groups and an index difference between two adjacent focal planes of the focal planes in the sequence of the focal plane group is 0 or 1 or 2.

11. The multifocal display device according to claim 1, wherein the controller is configured to tune the focus of the focus tunable lens by applying a control signal of different values for each focal plane index.

12. The multifocal display device according to claim 1, wherein
the controller is configured to select the first focal plane group randomly from the plurality of focal plane groups, if no other focal plane group was selected before the first focal plane group.

13. The multifocal display device according to claim 1, wherein
the controller is configured to select the first focal plane group from the focal plane groups allowed by the selection rule, if another focal plane group was selected before the first focal plane group.

14. A method for providing a multifocal display, the method comprising:
selectively tuning a focus of a focus tunable lens to a plurality of N focal planes during a frame period, the focal planes having indices 1 to N assigned thereto in increasing or decreasing order of the focal planes' focal distances,
storing a plurality of focal plane groups, each focal plane group of the focal plane groups including the plurality of focal planes in a different sequence, each of the focal planes appears only once in each of the focal plane groups, an index difference between two adjacent focal planes in the sequence of one of the groups is 0 or 1 or 2,
wherein the selectively tuning comprises:
selecting a first focal plane group of the focal plane groups, and tuning, during a first frame period, the focus of the focus tunable lens to each one of the focal planes in the first group according to the corresponding sequence, and
selecting a second group from the focal plane groups allowed by a selection rule, and tuning, during a second frame period, the focus of the focus tunable lens to each one of the focal planes in the second group according to the corresponding sequence,
wherein the selection rule comprises that an index difference between a last focal plane of the focal planes in the sequence of the first group and a first focal plane of the focal planes in the sequence of the second group is 0 or 1 or 2.

15. A non-transitory computer-readable medium comprising a program code for controlling a multifocal display device to perform the method of claim 14.

16. A multifocal display device, the multifocal display device comprising:
a focus tunable lens;
a controller configured to selectively tune a focus of the focus tunable lens to a plurality of N focal planes during a frame period, the focal planes having indices 1 to N assigned thereto in increasing or decreasing order of the focal planes' focal distances,
a storage storing a plurality of focal plane groups, each group comprising the plurality of focal planes in a different sequence,
wherein the controller is configured to select a first group of the focal plane groups, and tune, during a first frame period, the focus of the focus tunable lens to each one of the focal planes in the first group according to the corresponding sequence,
wherein the controller is configured to select a second group from the focal plane groups allowed by a selection rule, and to tune, during a second frame period, the focus of the focus tunable lens to each one of the focal planes in the second group according to the corresponding sequence,
wherein the selection rule comprises that an index difference between a last focal plane of the focal planes in the sequence of the first group and a first focal plane of the focal planes in the sequence of the second group is 0 or 1 or 2, and
wherein the selection rule further comprises that a position distance between two focal planes, of the focal planes, of a same index in the concatenated sequences of the first group and the second group, respectively, is between a predetermined minimum allowed distance and a predetermined maximum allowed distance.

* * * * *

UNITED STATES PATENT AND TRADEMARK OFFICE
CERTIFICATE OF CORRECTION

| | |
|---|---|
| PATENT NO. | : 11,662,547 B2 |
| APPLICATION NO. | : 16/741849 |
| DATED | : May 30, 2023 |
| INVENTOR(S) | : Boev et al. |

It is certified that error appears in the above-identified patent and that said Letters Patent is hereby corrected as shown below:

In the Claims

Claim 5: Column 11, Line 3: "the maximum allowed distance is in a range of $(2N_{fp} - 2\text{to}$" should read -- the maximum allowed distance is in a range of $(2N_{fp} - 2)$ to --.

Signed and Sealed this
Nineteenth Day of September, 2023

Katherine Kelly Vidal
*Director of the United States Patent and Trademark Office*